Patented May 22, 1945

2,376,852

UNITED STATES PATENT OFFICE 2,376,852

TREATMENT OF OILSEEDS

Aaron M. Altschul and Melvin L. Karon, New Orleans, La., assignors to Claude R. Wickard, as Secretary of Agriculture of the United States of America, and his successors in office No Drawing. Application April 2, 1943, Serial No. 481,598

2 Claims. (Cl. 260—412.3)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the treatment of oilseeds, such as cottonseed, soybeans, and so forth.

Cottonseed which has a moisture content of nine to eleven percent can be stored in mass for several years without an appreciable formation of free fatty acid. If, however, the moisture content of the seed is materially higher, it is difficult to store the seed for any appreciable length of time. Moist seed develops a considerable amount of free fatty acid upon short storage; it heats up so that the temperature of a well packed cottonseed pile or mass may go above 130° F.; the oil obtained from such seed is considerably darker in color; and the seed is very susceptible to mold growth. Consequently, high moisture content seed has a low market value and oil from deteriorated seed shows a high refining loss.

In order to counteract the effect of high moisture on cottonseed in present plant practice, cold air is drawn through the cottonseed masses to reduce the moisture content somewhat and keep the seeds cool. This practice, however, is at best, a temporary measure because the moisture content of the seed cannot be materially reduced by such a treatment. It is not possible to reduce the heat appreciably in large cottonseed masses, and even if the seed is cooled to 75° F., or lower, there is yet a considerable amount of free fatty acid development accompanied by a darkening of the color of the oil obtained from the seed. Thus, at present, it is not considered advisable to store cottonseed of high moisture content.

The deterioration of cottonseed is a natural process resulting from the activity of the enzyme systems in the seed. When the moisture content of the seed is high, these natural activities are accelerated and, consequently, the rate of deterioration is increased. Thus, a high moisture content seed has a high rate of respiration which results eventually in the heating of the seeds. The increased activity of lipolytic enzymes with higher moisture content causes greater hydrolysis of the glycerides, and increased oxidative activity results in the conversion of some natural pigments of the cottonseed into the highly colored oxidized forms. Heating of the seeds increases the rate of damaging inasmuch as all these natural degradative processes are accelerated at higher temperatures.

The pH of normal fresh cottonseed, determined by grinding some of the crushed kernels with distilled water and measuring the pH of the mixture with a glass electrode, varies from 6.50 to 7.00.

We have discovered that the storage properties of the seed are materially improved by increasing its pH to not less than 8, that oil obtained from it is of improved quality, and that the treatment is effective to enhance the properties of oils obtained from oilseeds generally.

In the practice of this invention, the cottonseed is preferably treated with ammonia until the pH of the seed is raised to a value between 8 and 8.5. This can be accomplished in several ways, depending on the quantity of cottonseed to be treated. The cottonseed is either treated in large batch quantities, continuously while putting it into bins, or the ammonia is introduced directly into air tight storage bins containing the cottonseed. The length of time necessary to raise the pH of the seed to a value between 8 and 8.5 will depend to some extent on the type of machinery used. The seed may be kept in an atmosphere of ammonia for about fifteen minutes and then allowed to remain in a closed container until the pH has risen to the desired value, which will generally take no longer than 24 hours. When the desired pH value has been reached, the excess ammonia may be removed by blowing air over the seed. Removal of the excess ammonia is, however, not necessary since the upper limit on the pH is not critical.

Although use of ammonia is preferable, the same result may be accomplished by the use of other volatile bases which produce the required adjustment of the pH.

As a result of such treatment, cottonseed with a moisture content as high as 20 percent has been successfully stored for over eight months, without developing an appreciable amount of free fatty acid. The seeds did not heat at all, and the color of the resulting oil was lighter than the original color of the untreated seed.

In addition to inhibiting the natural deteriorative processes in the seed, the treatment also successfully prevents the growth of molds on the moist cottonseed.

Not only does the treatment prevent further darkening of color of oils obtained from the seed, but it also reduces the dark color of the oil obtained from oilseeds generally. The color of cottonseed oil varies for different batches of seeds and appears to depend on the location of growth and the variety of seed. Thus it is possible to find fresh seed of low moisture content with a dark, undesirable color in the seed oil. Although such a seed stores well and does not develop more color in the oil upon storage, it, nevertheless, has a lower market value because of the objectionable dark color in its oil. The treatment of the seed as described above will effectively reduce the color of the oil obtained from the seed and convert an otherwise off-grade seed into one of prime quality.

In the practice of the invention for improving the color of oil derived from cottonseed generally, the cottonseed is treated in the manner above-stated until the pH of the seed is raised to a value of 8 to 8.5. After treatment the seed may be stored until it is desired to extract the oil. The seed should ordinarily be stored for not less than one week before obtaining the oil inasmuch as it requires that much time for the full effect of this treatment to be observed.

The treatment for improving the color of the cottonseed oil generally does not require any special method for extracting the oil from the cottonseed. Any method which represents good mill practice will give the desired results.

The treatment of this invention is not confined to cottonseed alone. It has also been applied to soybeans of high moisture content and has substantially the same effect on them. Soybeans, which have been treated so that their pH is raised to a value between 8 and 8.5, will not develop appreciable quantities of free fatty acid upon storage, although soybeans of the same moisture content, but untreated, will not store well.

In the practice of this invention for oilseeds other than cottonseed, the same procedure as described for cottonseed may be used. The equipment used to effect the treatment may have to be modified somewhat to suit the type and quantity of seed, but otherwise the procedure is the same.

Having thus described the invention what is claimed is:

1. A process comprising treating oilseeds with a volatile base to raise the pH to not less than 8, storing for not less than one week, and thereafter extracting oil therefrom, whereby the oil is considerably lightened in color.

2. A process comprising treating oilseeds with ammonia to raise the pH to not less than 8, storing for not less than one week, and thereafter extracting oil therefrom, whereby the oil is considerably lightened in color.

AARON M. ALTSCHUL.
MELVIN L. KARON.